J. CASE.
Farm Gate.
No. 55,058.
Patented May 29, 1866.
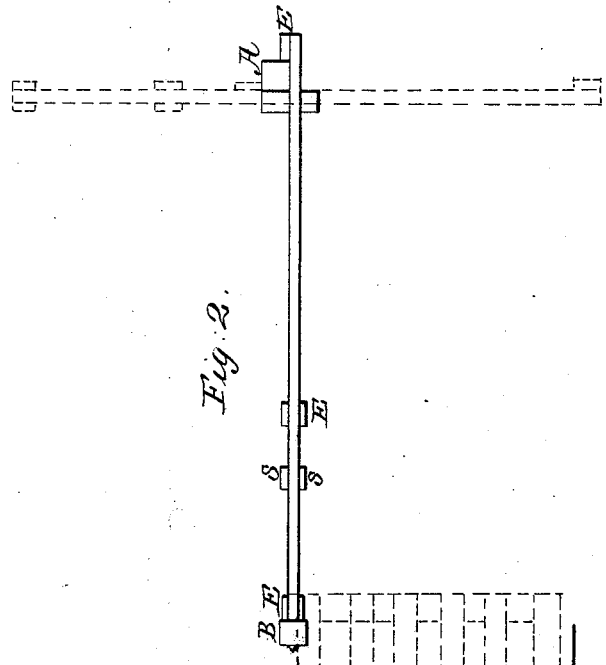
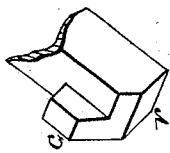
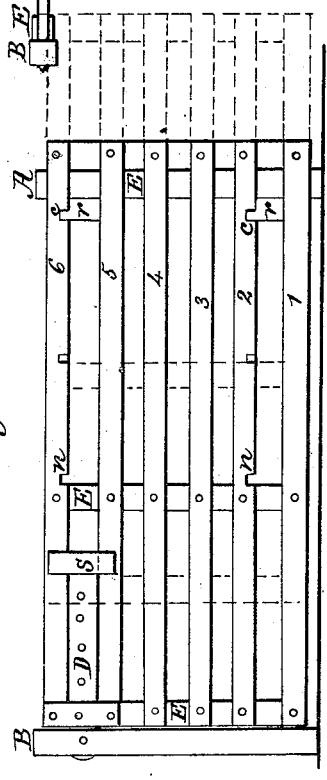
Witnesses
Inventor,
Jarvis Case
By his Attys
H.E. Dodge

UNITED STATES PATENT OFFICE.

JARVIS CASE, OF SPRINGFIELD, OHIO.

IMPROVEMENT IN FARM-GATES.

Specification forming part of Letters Patent No. 55,058, dated May 29, 1866.

*To all whom it may concern:*

Be it known that I, JARVIS CASE, of Springfield, in the county of Clarke and State of Ohio, have made certain new and useful Improvements in Farm-Gates; and I hereby declare the following is a full and exact description thereof, reference being had to the accompanying drawings, and to the letters of reference marked thereon.

My invention relates to that class of farm-gates that are operated without being permanently hinged to the post; and it consists in a novel arrangement of rests or supports permanently attached to the post, so the gate can readily be placed in its proper position in relation to the post, and when closed is firmly held in place, but may be slid back and swung round, leaving the space between the posts clear for the passage of vehicles, &c., and also in a novel arrangement for only partially opening for the passage of live stock, &c.

Figure 1 is a side elevation; Fig. 2, a top-plan view of the gate, and Fig. 3 a perspective view of one of the supports detached.

The supports $r\ r$, having shoulders $c\ c$, as shown in Fig. 3, are permanently attached to the post A. 1 2 3 4 5 are the horizontal slots of the gate, permanently fastened to the upright pieces $e\ e\ e$.

The notches $n\ n$ on the under side or edge of the slots 2 and 6 are made of the proper size to correspond to the shoulders $c\ c$ on the rests or supports $r\ r$, so that by placing the gate in a position that the notches $n\ n$ will be opposite the shoulders $c\ c$ it may be slid on the rests $r\ r$ and moved forward, as shown in Fig. 1. At least one of the rests or supports $r\ r$ should be made of the proper width to agree with the space between the slots of the gate 1 and 2, or 5 and 6, so that when closed the gate cannot be raised. The adjustable piece D is placed between the slots 5 and 6 and is held in place by the cleats $s\ s$ and extends into the mortise in the post B, with fastenings by pins or otherwise to both the gate and post, so that when it is desired to only partially open the gate the fastening to the gate is removed, which will allow the gate to slide back on the adjustable piece D, as shown in red in Fig. 1; but when a full opening of the gate is desired the fastening to the post B should be removed, and thus allow the gate to be slid back and swung round, as shown in Fig. 2.

From the construction of the gate and rests or supports upon which it is operated, it will readily be seen that the gate is conveniently placed in its proper position in relation to the post, and when closed is firmly held in place, but may be slid back to near its center and swung round, leaving a clear space between the posts. It is also plain that if it should be so desired the gate may be readily and easily removed from the rests upon which it is operated.

When closed, or only partially open, the weight of the gate is supported by both posts, thus preventing the liability of inclining, as is the case with the common gate, and a much smaller post will answer the purpose; and much of the value of this improvement consists in the simplicity and cheapness of its construction and convenience of operation combined with permanency and durability.

The shoulders on the rests or supports are so constructed and arranged that they prevent the gate from being thrown off the rests or supports, holding it in an upright position whether open or closed; but when the gate is moved back so that the notches in the slots of the gate are opposite the shoulders on the rests or supports the gate may be taken off and removed from the posts.

I do not wish to be understood as claiming, broadly, the construction of a gate that will slide back and swing round, for I am aware that such have been in use; but I am not aware that the rests or supports of a sliding and swinging gate have been in use as I construct and use them; so I confine my claim to my particular arrangement and combination.

Having thus fully described my invention, what I claim, and desire to secure by Letters Patent, is—

1. So constructing and arranging the rests or supports $r\ r$, with shoulders $c\ c$, in combination with the notches $n\ n$ and post A, that the gate may be readily placed on said rests or supports in its proper position in relation to the post, and moved forward to close the gate, or swung round to fully open it, or, if so desired, may be taken off the rests or supports and removed from the post, substantially as described.

2. So combining and arranging the rests or supports *r r* and adjustable piece D with the gate and posts that when closed the gate is firmly held in place, or may be partially opened and still retained in its proper position, resting a portion of its weight on each post, substantially as set forth.

JARVIS CASE.

Attest:
F. K. MOWER,
GEO. MOWER.